United States Patent [19]
Perry

[11] Patent Number: 5,725,379
[45] Date of Patent: Mar. 10, 1998

[54] BRAILLE LEARNING APPARATUS

[76] Inventor: Albert William Perry, 1836 Feltham Road, Victoria, B.C., Canada, V8N 2A6

[21] Appl. No.: 798,629

[22] Filed: Feb. 11, 1997

[51] Int. Cl.[6] .............................. G09B 21/00; G09B 5/00; G06K 9/00
[52] U.S. Cl. ...................... 434/113; 434/112; 434/116; 434/169; 434/307 B
[58] Field of Search ...................... 434/112, 113, 434/116, 169, 222, 307 R, 308, 309, 340, 359, 311, 316, 318, 321, 322, 323, 327, 335; 400/109, 109.1

[56] References Cited

U.S. PATENT DOCUMENTS

| | | | |
|---|---|---|---|
| 3,307,274 | 3/1967 | Glaser | 434/113 |
| 3,748,748 | 7/1973 | Bevan et al. | |
| 3,784,763 | 1/1974 | Budrose | 434/113 |
| 4,027,405 | 6/1977 | Schloss | |
| 4,215,813 | 8/1980 | Hill et al. | |
| 4,639,225 | 1/1987 | Washizuka | 434/308 |
| 5,001,696 | 3/1991 | Baldwin | 364/521 |
| 5,177,800 | 1/1993 | Coats | |
| 5,511,980 | 4/1996 | Wood | 434/169 |

FOREIGN PATENT DOCUMENTS 2201025  8/1988  United Kingdom ............ 434/318

*Primary Examiner*—Richard J. Apley
*Assistant Examiner*—John Edmund Rovnak
*Attorney, Agent, or Firm*—Robert H. Barrigar; Barrigar & Moss

[57] ABSTRACT

A braille learning apparatus for use with a computer comprising a set of tactile flash cards, each individual card having a pattern of braille dots embossed on a surface of the card and two electrically connected contacts at a unique set of discrete spaced positions on the card with a preselected correspondence between the pattern of braille dots on the surface of the card and the selected positions of the contacts, and a tactile flash card reader capable of sensing the positions of the contacts on a card.

20 Claims, 4 Drawing Sheets

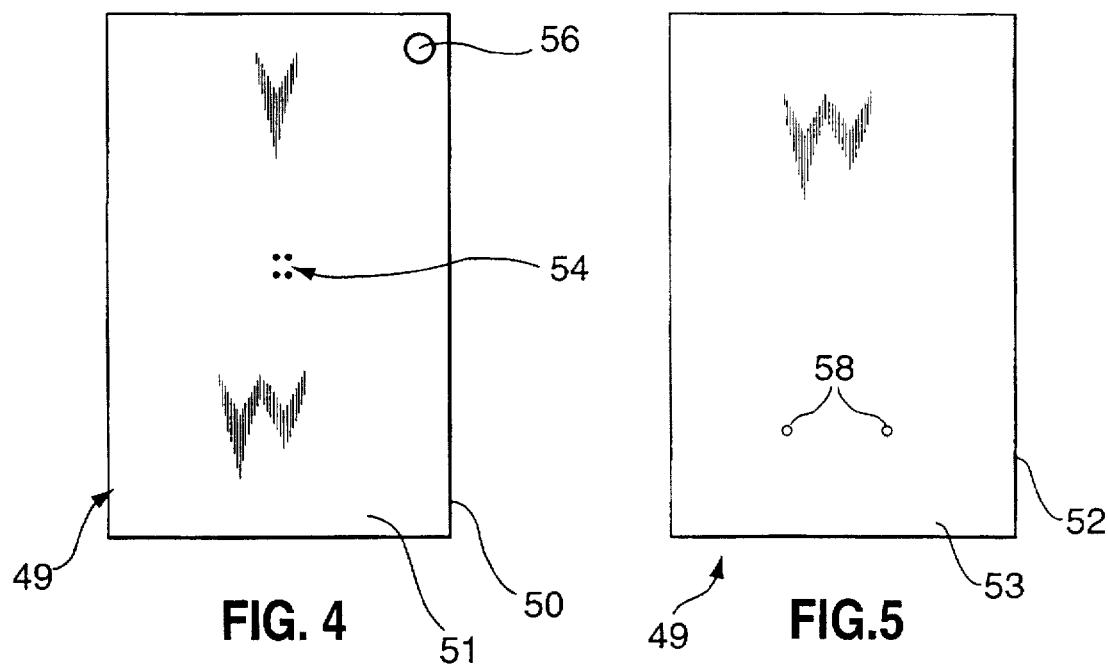
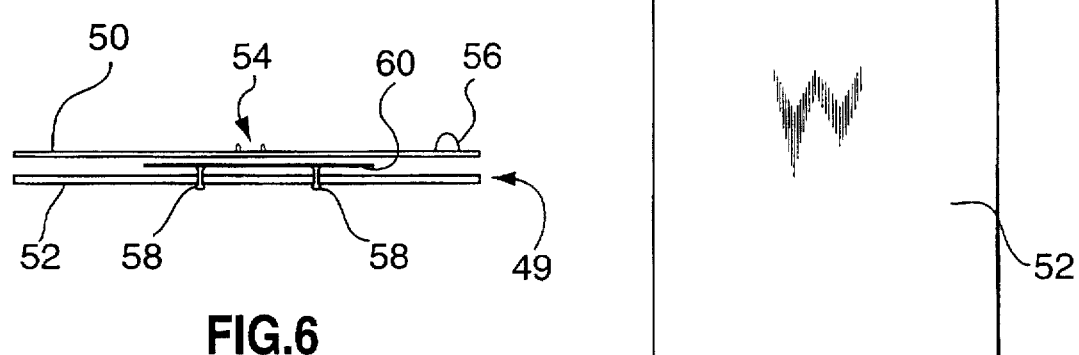

BRAILLE LEARNING APPARATUS

FIELD OF THE INVENTION

This invention relates to the field of devices designed to assist the blind or nearly blind in learning braille by speaking, sounding, or displaying in enlarged form a letter, number, word, phrase, or musical note corresponding to a pattern of braille dots embossed upon a tactile flash card.

BACKGROUND OF THE INVENTION

Braille is a tactile system using raised dots to represent the letters of the alphabet, numerals, punctuation marks, or musical notes for persons with severe visual impairment. Each letter of the alphabet, numeral, punctuation mark, or musical note is formed from raised dots arranged within a cell (a "braille cell") having three rows and two columns. Braille is read by moving the fingers gently over the surface which has been embossed with the braille dots.

There are many available devices to aid persons who know braille in using braille, but few devices to help the blind and those with failing vision to learn braille. This is unfortunate, as braille literacy can expand the world for persons having severe visual impairment.

Typically braille is taught by a teacher working with one student at a time. The teacher may present material written in braille to the student, who then attempts to read it correctly. The teacher is available to provide feedback as to the correctness of the student's reading of the braille. Self-study is difficult for a blind person as immediate feedback is normally not possible. The blind student cannot easily check his or her work.

The prior art of which the inventor is aware includes braille learning aids that use tactile flash cards with embedded magnetic tape read in a manner similar to that used in an audio tape player. For example, in Schloss, U.S. Pat. No. 4,027,405, a tape read head is moved past a length of magnetic tape embedded in a tactile flash card. To hear the letter or word corresponding to the braille embossed on the face of the card spoken the student places the card on the reader. The tape read head then moves past the embedded tape picking up the recording of the material corresponding to the braille. Devices such as that disclosed in Schloss contain moving parts and hence would be susceptible to damage by young students learning on their own.

An apparatus for learning braille capable of being operated independently by a person having little or no vision is highly desirable, particularly for unaided home study. Such an apparatus should be simple to use and either be inexpensive or use readily available technology such as a personal computer with a sound card. Further, such an apparatus should be flexible enough to allow easy revision of both (1) the particular braille characters, words, or sentences being taught and (2) the voice reading the braille to be changed to either another person's voice or to a sound. For example, the word "bird" might be spoken and the sound of a bird played when a card having the braille for "bird" is read by the system.

SUMMARY OF THE INVENTION

The present invention is directed in one aspect to providing a braille learning apparatus for use with a computer having a keyboard port and that is capable under program control of sound generation, visual display of graphics, or both sound generation and visual display of graphics. The braille learning apparatus is comprised of a housing in which is mounted a grid board having a card-receiving surface with a multiplicity of discrete pairs of electrically conducting contacts. At least one removable card having a periphery mating with that of the card-receiving surface and having a front and a back surface is provided. Normally, there would be provided a set of such cards, each corresponding to a unique braille character or group of characters.

Each card has (1) a pattern of braille dots embossed upon its front surface, (2) means for tactilely identifying a preselected orientation of the card for positioning the card in mating contact with the card-receiving surface, and (3) a pair of electrically connected conducting contacts protruding from the card's back surface at preselected positions corresponding to the positions of a selected one of the discrete pairs of the electrically conducting contacts on the card-receiving surface of the grid board. If a card is positioned with back surface of the card in mating contact with the card-receiving surface in the preselected orientation, then the selected pair of electrically conducting contacts on the card-receiving surface of the grid board is electrically connected together.

The grid board is mounted to the housing so that the card may be placed, on the basis of tactile information only, upon the grid board with the back surface of the card in mating contact with the card-receiving surface in the preselected orientation. Also mounted in the housing is a keyboard encoder having an output port for connection by cable of the keyboard encoder to the keyboard port of the computer.

The keyboard encoder is electrically connected to the grid board contacts so as to send a keystroke signal to the keyboard port of the computer in response to the electrical connection together of a pair of grid board contacts, said keystroke signal determined by location of the pair of electrically connected contacts.

Optionally, software for use with a computer capable of sound generation under program control is provided for operating the computer so that the computer generates preselected sound for each discrete keystroke signal received at the keyboard port. The sound may be selected to correspond to the pattern of braille dots on a card placed in mating contact with the card-receiving surface in the preselected orientation.

Optionally, the sound generated by the computer may be selected to be the spoken equivalent of the pattern of braille dots on the card. Another option is for the spoken equivalent generated by the computer to be generated from digitized recorded human speech.

Optionally, software for use with a computer capable of visual display of graphics capable under program control is provided for displaying a preselected graphic representation of the pattern of braille dots embossed upon the card.

In another aspect the present invention is directed to providing a set of cards for learning braille comprising a plurality of individual cards. Each individual card has a pattern of braille dots embossed on a surface of the card and two electrically connected contacts at a unique set of discrete spaced positions on the card, with a preselected correspondence between the pattern of braille dots on the surface of the card and the selected positions of the contacts. The set of cards may be used in an apparatus having means for storing data representing the correspondences between the pattern of braille dots on the surface and the positions of the contacts on each individual card, position sensing means for sensing the positions of the contacts on a card, and means for producing a distinct sound in response to the positions of the contacts on a card based upon the stored data representing the correspondences. Each distinct sound is uniquely correlated with a selected one set of the positions of the contacts.

BRIEF DESCRIPTION OF THE DRAWINGS

FIG. 4 is a front view of a preferred embodiment of a card for use with the card reader of FIG. 1.

FIG. 5 is a back view of the card of FIG. 4.

FIG. 6 is a bottom elevation view of elements of a preferred embodiment of the card of FIG. 4 partially exploded.

FIG. 7 is a front view of a preferred embodiment of the back panel of the card of FIG. 4.

DETAILED DESCRIPTION OF THE PREFERRED EMBODIMENT

Figure 1:
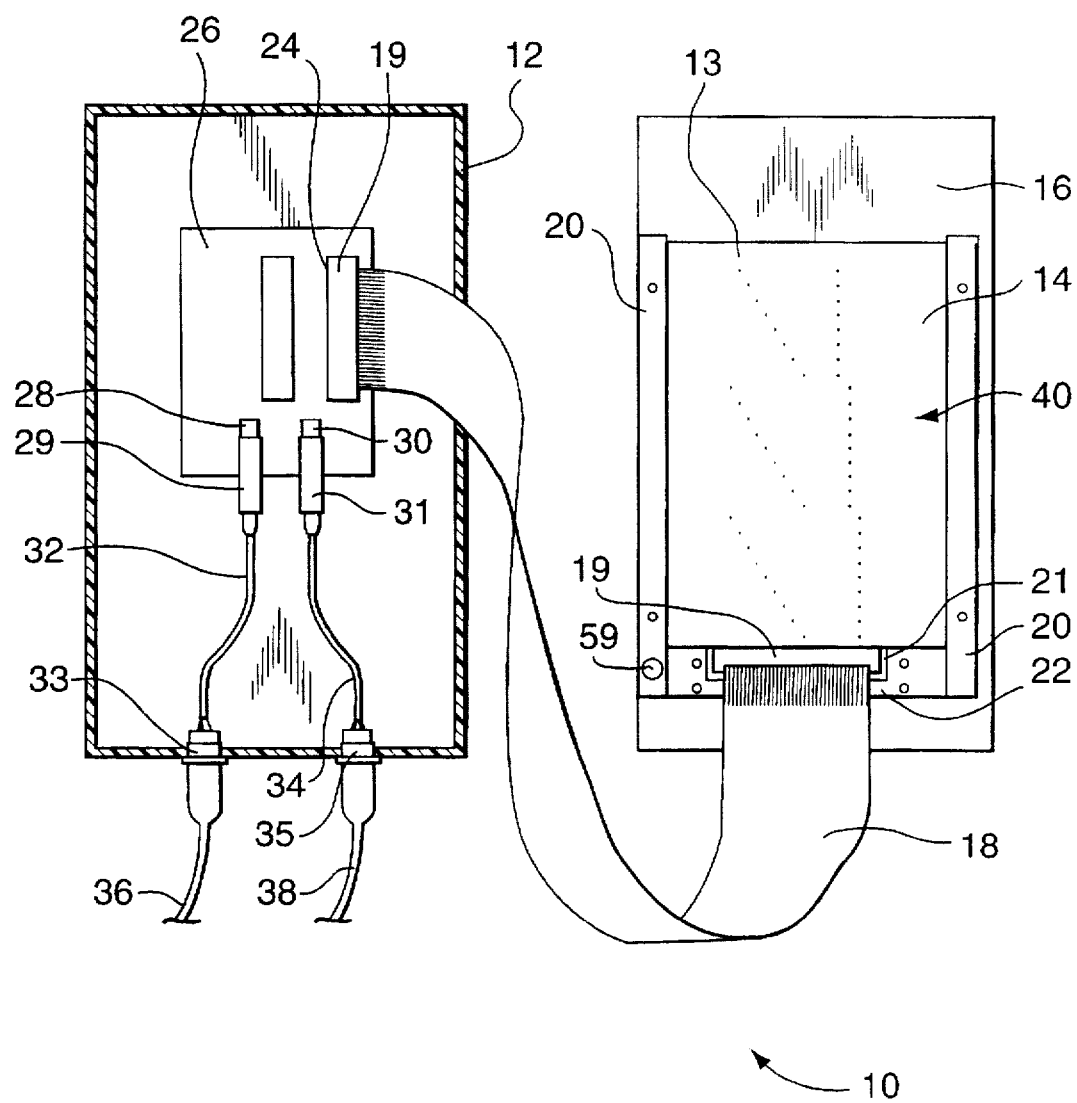
FIG. 1 is an overall schematic plan view of a preferred embodiment of the card reader of a braille learning apparatus in accordance with the invention with the grid board mounting plate lifted out of the housing to reveal the keyboard encoder.

The preferred embodiment of the invention is comprised of a reader, generally indicated by numeral 10 in FIG. 1, a set of tactile flash cards, each having a pattern of braille dots embossed upon one surface, a representative example of which card is illustrated in FIGS. 4–7 and generally indicated by numeral 49, and software for use with an IBM or compatible personal computer (not shown) employing at least a 80286 microprocessor and having a standard PC keyboard port and a Sound Blaster (TM) or a compatible sound card with associated driver software and having speakers or headphones. Attached to the end of the description of the preferred embodiment are two example program listings of the software.

The reader 10 is comprised of a housing 12, which may be a tool box type of container, in which is mounted a keyboard encoder 26. The preferred keyboard encoder 26 is a KE-18 PC Keyboard Encoder made by Hagstrom Electronics, 2 Green Lantern Blvd., Endicott, N.Y. 13760. The K.E.-18 encoder has an output port 28 for connection to the keyboard port of an IBM or compatible personal computer and a pass-through port 30 for connection to a standard PC keyboard. Each of ports 28/30 is a five pin DIN-type female connector. The keyboard encoder 26 receives power for its operation from the keyboard port of an IBM or compatible personal computer to which it is connected.

In addition to its function as a keyboard encoder as described below, the keyboard encoder 26 will pass a keystroke signal sent from a standard PC keyboard (not shown) connected to the pass-through port 30 through to an IBM or compatible personal computer (not shown) connected to the output port 28. This functionality is needed for starting and stopping a software running on the computer, switching from the running of one software program to another, and testing of software.

The keyboard encoder 26 also provides a 2×20 pin input header 24 (not visible in FIG. 1) to receive a 40 wire ribbon cable plug 19. Input header 24 provides two grounded pairs of pins labelled G on the keyboard encoder 26, nine pairs of column pins labelled C1 through C9 on the keyboard encoder 26, and nine pairs of row pins labelled R1 through R9 on the keyboard encoder 26 with the pins of each discrete pair of pins electrically connected together. The keyboard encoder 26 may be used in either a 9×9 matrix scan mode or an 18 input mode. In the preferred embodiment of the invention the 9×9 matrix scan mode is used. In this mode, the keyboard encoder 26 produces a keystroke signal at the output port 28 in response to the shorting of one pair of row pins of the input header 24 to one pair of column pins of the input header 24. As there are nine pairs of row pins and nine pairs of column pins, the maximum number of discrete keystroke signals that can be generated by the keyboard encoder 26 operating in this mode is 81. In the preferred embodiment three pairs of column pins and nine pairs of row pins are used to produce keystroke signals corresponding to the 26 letters of the alphabet with one combination of pairs of row and column pins remaining unused. The following combinations of pins on the keyboard encoder 26 are used in the preferred embodiment to produce the keystrokes indicated below:

| Keystroke | Column/Row Combination |
| --- | --- |
| A | C1/R1 |
| B | C1/R2 |
| C | C1/R3 |
| D | C1/R4 |
| E | C1/R5 |
| F | C1/R6 |
| G | C1/R7 |
| H | C1/R8 |
| I | C1/R9 |
| J | C2/R1 |
| K | C2/R2 |
| L | C2/R3 |
| M | C2/R4 |
| N | C2/R5 |
| O | C2/R6 |
| P | C2/R7 |
| Q | C2/R8 |
| R | C2/R9 |
| S | C3/R1 |
| T | C3/R2 |
| U | C3/R3 |
| V | C3/R4 |
| W | C3/R5 |
| X | C3/R6 |
| Y | C3/R7 |
| Z | C3/R8 |

The reader 10 is also provided with two female DIN type sockets 33/35 each having a ground terminal and five signal terminals and mounted through a wall of the housing 12 and two cables 32/34, each cable 32/34 ends in a DIN type male connector 29/31. The end of cable 32 not ending in connector 29 is connected to socket 33 with soldered individual connections of the conductors of cable 32 to the appropriate terminals of socket 33. Male connector 29 may then be plugged into output port 28. A computer connection cable 36 may then be connected to output port 28 by plugging it into socket 33. Similarly, cable 34 is connected to socket 35 with soldered individual connections of the conductors of cable 34 to the appropriate terminals of socket 35. A keyboard connection cable 38 may then be electrically connected to pass-through port 30 by plugging it into socket 35. The interposition of sockets 33/35 and cables 32/34 between the connection cables 36/38 and ports 28/30 tends to protect the keyboard encoder 26 from mechanical damage that might be caused by repeated connection and disconnection of computer connection cable 36 and keyboard connection cable 38 directly to and from output port 28 and pass-through port 30, respectively.

Figure 3:
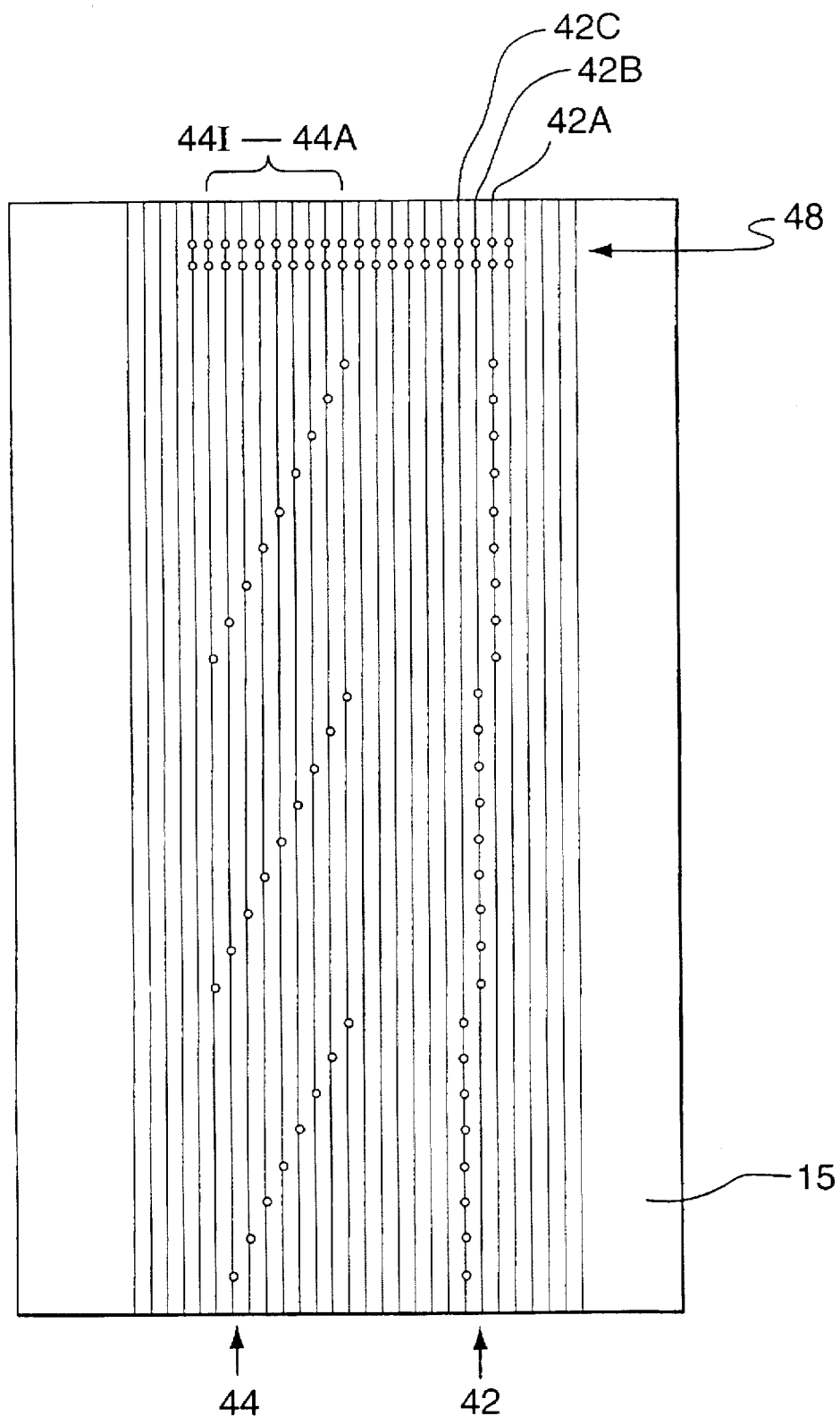
FIG. 3 is a schematic bottom view of a preferred embodiment of the grid board of FIG. 2.

A grid board 13 having a card-receiving top surface 14 and a bottom surface 15 illustrated schematically in FIG. 3 is attached to mounting plate 16 made from acrylic sheet material. In the preferred embodiment a 100 mm×160 mm pre-etched perforated grid board made by Vero Electronics and bearing part number 07 0008 is used for grid board 13. The mounting plate 16 with attached grid board 13 is removably mounted in the housing 12. In FIG. 1, mounting plate 16 with the attached grid board 13 has been removed from the housing 12 to expose the keyboard encoder 26. If a tool box has been used for the housing 12, then mounting plate 16 may replace the shelf of the box. Raised acrylic side borders 20 and top border 22 are bolted or glued to the mounting plate 16. The top border 22 has an cutout to accommodate a 40 pin ribbon cable socket 21. The borders 20/22 are ⅛" thick and act as tactile guides to aid in the positioning of the card 49 directly over grid board 13. The top border 22 and side borders 20 are at right angles to each other and are spaced apart by the width of the cards 49. The portion of the grid board 13 between the side borders 20 and the top border 22 comprises a card-receiving surface 14 for receiving cards 49. A plastic bump 59 is provided on one of the side borders 20 to allow a blind person to determine the orientation of the card-receiving surface 14.

Figure 2:
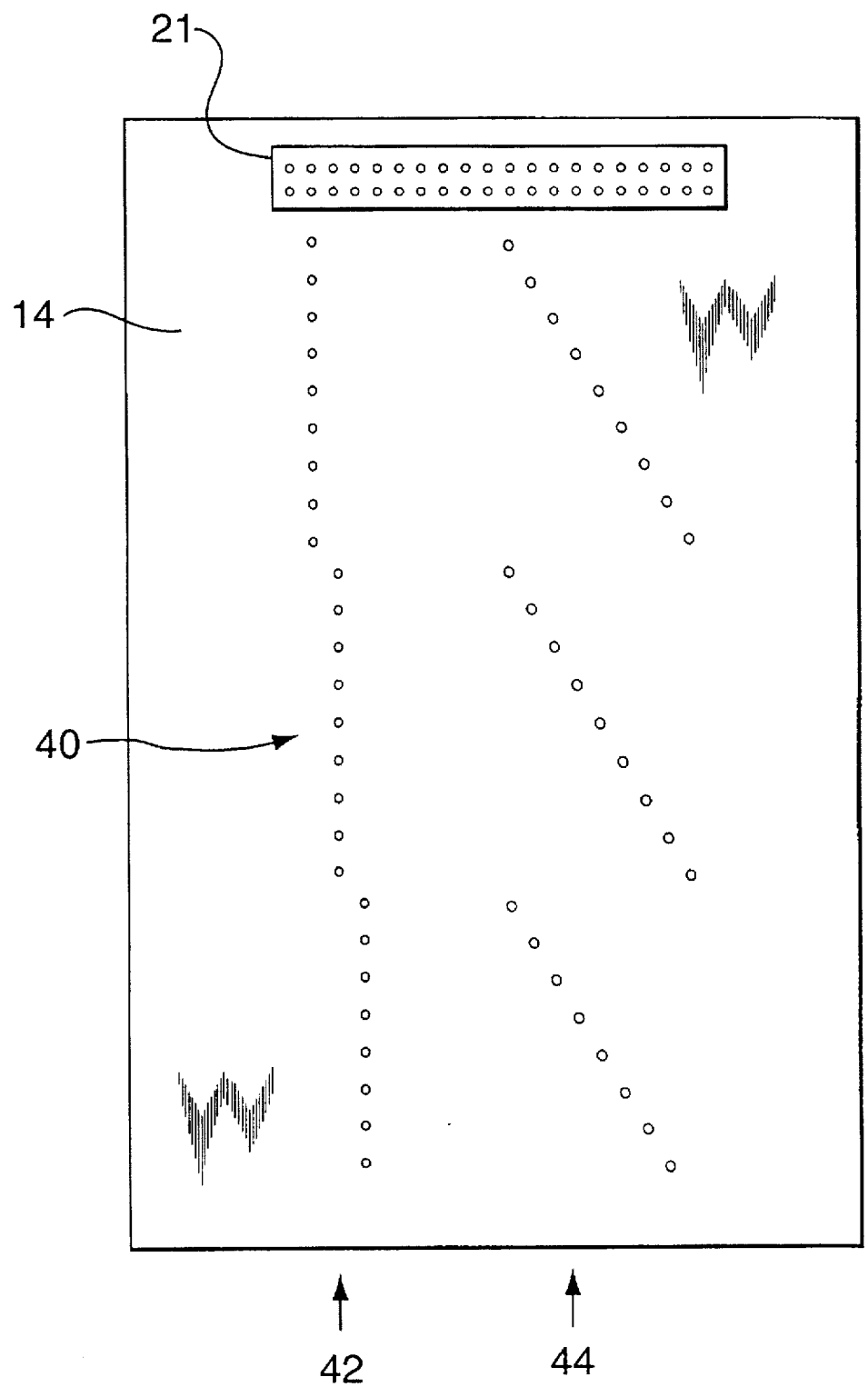
FIG. 2 is a plan view of a preferred embodiment of the grid board of the card reader of FIG. 1.

The grid board 13, illustrated in more detail in FIGS. 2 and 3, is perforated with a rectangular matrix of holes (not shown) with a spacing manufactured for circuit components such as sockets and integrated circuits. The bottom surface 15 of grid board 13 is provided with 28 common copper foil strips running the length of the circuit card 13, of which 12 are used in the preferred embodiment of the invention. In FIG. 3 each common copper foil strip is shown schematically as a line, but in fact each strip has a width of approximately 2 mm and is spaced from its neighboring strips by a spacing of approximately 1 mm. Each copper foil strip connects the holes in one row of holes of the rectangular matrix of holes that forms the perforations of the grid board 13 so that a pin of a component inserted through a hole of a row of the matrix from the card-receiving surface 14 and soldered to the copper foil strip on the bottom surface 15 penetrated by that hole is electrically connected to any other pin inserted through a hole penetrating the same strip and soldered to that strip. Specifically, in the preferred embodiment of the invention a ribbon cable socket 21 having 20 pairs of pins 48 is soldered to the grid board 13 near the top of the grid board 13 by inserting the pins 48 from the card-receiving surface 14 through holes in the grid board 13 and soldering the pins to the copper strips penetrated by those holes. The strips on the bottom surface 15 electrically connect the pins of each pair of pins 48 to anything soldered to the same strip as illustrated in FIG. 3. In the preferred embodiment 12 strips are used, three pairs 42 of column strips labelled as strips 42A, 42B, and 42C, and nine pairs 44 of row strips labelled as strips 44A, 44B, 44C, 44D, 44E, 44F, 44G, 44H, and 44I are used.

A 40 conductor ribbon cable 18 having ribbon cable plugs 19 at each end connects the ribbon cable socket 21 to the input header 24. Each pair of pins of the ribbon cable socket 21 are then electrically connected to a pair of pins of the input header 24 so that one pair of pins of the input header 24 may be shorted to second pair of pins of the input header 24 by shorting the corresponding strips on the bottom surface 15 of grid board 13. Strips 42A, 42B, and 42C correspond to column pins C1, C2, and C3, respectively, of the input header 24. Similarly, strips 44A, 44B, 44C, 44D, 44E, 44F, 44G, 44H, and 44I correspond to row pins R1, R2, R3, R4, R5, R6, R7, R8, and R9 of the input header 24.

In general, the reader 10 operates to produce a keystroke signal when one of the column strips 42 is shorted to one of the row strips 44, thereby shorting of one pair of column pins C1, C2, or C3 of the input header 24 to one pair of row pins R1, R2, R3, R4, R5, R6, R7, R8, or R9 of the input header 24. To reduce that possibility of inadvertent shorting of a column strip to a row strip 26 pairs of contacts each electrically connected to a discrete row or column strip and generally indicated by numeral 40 in FIGS. 1 and 2 are provided upon the card-receiving surface 14. The card-receiving surface 14 is composed of electrically insulating material. Each contact is a ½" 18 gauge escutcheon pin made of brass that has been inserted through a discrete one hole of the matrix of holes penetrating the grid board 13 and soldered in place to the strip on the bottom surface 15 penetrated by that hole. Each such hole is drilled out slightly to enable insertion of the escutcheon pin. The excess portion of each pin protruding from the bottom surface 15 is then removed.

The 26 pairs of contacts 40 may be used to represent the letters of the alphabet. However, words, phrases, or sounds may also be represented. As the keyboard encoder 26 can produce 81 discrete keystroke signals, the number of discrete pairs of contacts 40 can be increased to 81, but with the risk of increasing the likelihood of inadvertent shorting of a column strip to a row strip. The use of 26 pairs of contacts 40 is convenient as the most basic embodiment of the invention is a braille trainer for use by persons learning the braille representation of the alphabet. However, the correspondence between letters of the alphabet and the pairs of contacts is only one example of the uses of the invention.

The cards 49 illustrated in FIG. 4–7 are comprised of a 4"×6" front sheet 50, which is 0.020" in thickness, and a 4"×6" back sheet 52, which is 0.040" in thickness. Both sheets 50/52 are made of high impact polystyrene. A conducting copper strip 60 having raised contacts 58 is sandwiched between sheets 50 and 52. The front sheet 50 has a pattern of braille dots 54 embossed in the center of its front side 51 and a plastic bump 56 for tactile orientation in the right upper corner of the front side 51. The pattern of braille dots 54 is imprinted from the underside of sheet 50 by using a braille "stylet" and braille lettering guide known as a "slate".

The back sheet 52 of the card 49 has the metal contacts 58 protruding from its back surface 53 through holes drilled using a drill bit designed for use with plastics. The positions of these holes is critical. They are located to match the position of a selected pair of contacts 40 on the grid board 13, in the most basic embodiment of the invention corresponding to the letter of the alphabet corresponding to the pattern of braille dots 54.

The copper strip 60 is 2.5" long and ½" wide and is indented to a depth of approximately ⅛" at the locations of the two holes in the back sheet 52 of the card 49. The contacts 58 are formed from brass escutcheon pins which are pushed through from the convex side of the indentation and filled with solder to secure the pins. The excess portion of each pin is cut off and then the pins and solder are ground down flush with the copper strip. The copper strip is glued with epoxy glue to the back sheet 52 of the card 49 with the pin heads positioned through the card holes.

The front sheet 50 and back sheet 52 of a card 49 are glued together with epoxy glue with the braille impressions on the underside of the front sheet 50 filled with glue to strengthen the pattern of braille dots 54.

When a card 49 is placed on a grid board 13 the contacts 58 are brought into contact with a discrete pair of contacts 40 on the grid board corresponding to a letter of the alphabet.

As the contacts 58 are electrically connected by the copper strip 60 a short is produced between one column strip 42 and one row strip 44, in turn causing a keystroke to be produced by the keyboard encoder 26. The keyboard encoder 26 is connected to the keyboard input of a computer (not shown) having sound and graphics capability.

Software supplied with the preferred embodiment of the invention and loaded on the computer connected to the encoder 26 receives the input alphabetical letter and uses this as a menu item to generate the output of a preselected sound from sound card and associated speaker or headphones and to display enlarged braille on a computer monitor for persons with residual vision. Sample source code for the software for the Braille Trainer to learn the braille alphabet is listed at the end of the description of the preferred embodiment of the invention and is given the file name "FJ". Entry of those two letters will start the program with sound cues and messages to guide the user. "FJ" was used as on many makes of keyboards these two letters have raised underscores under these two letters or a raised dot in the center of the key, which may act as tactile markers for blind users.

The software listed below is written in Borland "C" code. The software installs a graphic environment and then uses a switch statement to channel the alphabet letter keystroke input to call on the braille dot-producing functions and to call an appropriate function to activate the sound card to generate sound output. The program is written for a computer equipped with a SoundBlaster (TM) sound card but a variety of makes of sound cards could be used with little change to the source code. In the present form the sound output is in English but output could be in any language as the source code calls on sound files recorded by the programmer via a microphone.

Different versions of the SoundBlaster (TM) card can be used with the program. The software reproduced below has been written for the SoundBlaster Pro (TM) card, but modifications are available from the manufacturers of the card to accommodate different versions of the card.

The card 49 enables tactile recognition and promotes tactile intelligence as the tactile message is linked to an alphabet input that computer software can recognize.

As is readily apparent from the description above little effort is required to change the stored sound corresponding to a particular card 49. For example, rather than a pattern of braille dots 54 corresponding to single letter of the alphabet, a card 49 might have a pattern of braille dots corresponding to a contraction of a word, several words, or a sentence, or to a musical note. The software can easily be changed to generate sound from a different stored sound file so that the sound generated could be a word or a phase or a sound of appropriate pitch and duration in the case of a pattern of braille dots corresponding to a musical note rather than a letter of the alphabet. A different set of cards 49 may be used corresponding to a different stored sound file. For example, a second program listing for a program having file name "FFJJ", which displays and plays back digitized speech comprised of a word of up to seven letters, follows the description of the preferred embodiment of the invention. The letters "FFJJ" are used for the reasons mentioned above, namely, because on many computer keyboards there are tactile markers for the letters "F" and "J".

Other modifications will be apparent to those skilled in the art and, therefore, the invention is defined in the claims.

```c
/****************************************************************
 * F.J.C.: RESPONDS TO INPUT OF ALPHABET BY OUTPUT OF DIGITIZED RECORDED *
 * SOUND OF EACH LETTER AND BY GRAPHICAL BRAILLE REPRESENTATION OF EACH  *
 * LETTER MAGNIFIED FOR PERSONS HAVING RESIDUAL VISION.                  *
 ****************************************************************/ include <stdio.h>
include <graphics.h>
#include <dos.h>
#include <conio.h>   /*for getch()*/
#include <stdlib.h>  /*for exit()*/
#include <process.h> /*for system calls*/
#include <ctype.h>   /*for tolower()*/
#define ESC 27

/****************************************************************
 * FUNCTIONS ONE() TO SIX() CREATE BRAILLE DOTS. NAMES OF FUNCTIONS    *
 * CORRESPOND TO BRAILLE DOT POSITIONS, NUMBERING FROM ONE TO THREE IN THE *
 * FIRST COLUMN AND FOUR TO SIX IN THE SECOND COLUMN READING FROM TOP TO   *
 * BOTTOM IN EACH COLUMN.                                                  *
 ****************************************************************/
void one(void)
{
    setcolor(14);        /*yellow*/
    circle(255,120,50);
    setfillstyle(1,14);
    floodfill(213,120,14);
}
void two(void)
{
    setcolor(14);
    circle(255,250,50);
    setfillstyle(1,14);
    floodfill(213,240,14);
}
void three(void)
{
    setcolor(14);
    circle(255,380,50);
    setfillstyle(1,14);
    floodfill(213,360,14);
}
void four(void)
{
    setcolor(14);
    circle(385,120,50);
    setfillstyle(1,14);
    floodfill(426,120,14);
} void five(void)
{
    setcolor(14);
    circle(385,250,50);
    setfillstyle(1,14);
    floodfill(426,240,14);
}
void six(void)
{
    setcolor(14);
    circle(385,380,50);
    setfillstyle(1,14);
    floodfill(426,360,14);
}
/****************************************************************
 * FUNCTION CUESOUND() produces a sound of middle C as a cue that the *
 * program is ready for input of an alphabet letter.                  *
 ****************************************************************/
void soundcue(void)
{
    sound(261.63); delay(100); nosound();
}
/***************/
int main (void)
/***************/
```

```c
    {
        int gdriver = DETECT, gmode, errorcode;
        void one(void);
        void two(void);
        void three(void);
        void four(void);
        void five(void);
        void six(void);
        void soundcue(void);
        char ch;
/*GRAPHIC SET-UP :*/
        errorcode = registerfarbgidriver(EGAVGA_driver_far);
        if(errorcode < 0)
          {
            printf("Graphics error: %s\n", grapherrormsg(errorcode));
            printf("Press any key to halt. \n");
            getch();
            exit(1);
          }
        initgraph(&gdriver, &gmode, "");
        errorcode = graphresult();

if(errorcode != grOk)
          {
            printf("Graphic error : sorry : %s\n", grapherrormsg(errorcode));
            printf("Press any key to halt. \n");
            getch();
            exit(1);
          }

/*TITLE PAGE AND START CUE :*/
        rectangle(0,0,639,479);
        settextstyle(0,0,3);
        setcolor(13); /*LIGHT MAGENTA*/
        outtextxy(296,50,"FJ");
        outtextxy(140,100,"BRAILLE TRAINER");
        setcolor(15); /*WHITE*/
        settextstyle(0,0,1);
        outtextxy(264,150,"(c) A.W. Perry,");
        outtextxy(224,175,"Victoria, B.C.,Canada");
        delay(3000);
        cleardevice();
        settextstyle(0,0,2);
        setcolor(15);
        outtextxy(64,240,"PRESS a to z.. Esc twice to quit.");
        delay(1000);
        cleardevice();
        system("vplay instruct.voc /q");  /*VOICE INSTRUCTION*/
        delay(25);
        soundcue();
/*ALPHABET INPUT AND OUTPUT OF SOUND AND GRAPHICS FOLLOWS:*/
        ch = getch();
        do
          {
            switch (tolower(ch))
              {
                case 'q':
                    system("vplay q.voc /q"); /*VOICE OUTPUT*/
                    one(); two(); three(); four(); five();
                    delay(1500);
                    cleardevice();
                    soundcue();
                    break;
                case 'w':
                    system("vplay w.voc /q");
                    two();four();five();six();
                    delay(1500);
                    cleardevice();
                    soundcue();
                    break;
                case 'e':
                    system("vplay e.voc /q");
                    one();five();
                    delay(1500);
                    cleardevice();
                    soundcue();
                    break;
```

15

```
case 'r':
    system("vplay r.voc /q");
    one();two();three();five();
    delay(1500);
    cleardevice();
    soundcue();
    break;
case 't':
    system("vplay t.voc /q");
    two();three();four();five();
    delay(1500);
    cleardevice();
    soundcue();
    break;
case 'y':
    system("vplay y.voc /q");
    one();three();four();five();six();
    delay(1500);
    cleardevice();
    soundcue();
    break;
case 'u':
    system("vplay u.voc /q");
    one();three();six();
    delay(1500);
    cleardevice();
    soundcue();
    break;
case 'i':
    system("vplay i.voc /q");
    two();four();
    delay(1500);
    cleardevice();
    soundcue();
    break;
case 'o':
    system("vplay o.voc /q");
    one();three();five();
    delay(1500);
    cleardevice();
    soundcue();
    break;
case 'p':
    system("vplay p.voc /q");
    one();two();three();four();
    delay(1500);
    cleardevice();
    soundcue();
    break;
case 'a':
    system("vplay a.voc /q");
    one();
    delay(1500);
    cleardevice();
    soundcue();
    break;
case 's':
    system("mmplay s.txt -ff > nul");
    two();three();four();
    delay(1500);
    cleardevice();
    soundcue();
    break;
case 'd':
    system("vplay d.voc /q");
    one();four();five();
    delay(1500);
    cleardevice();
    soundcue();
    break;
```

```
case 'f':
    system("vplay f.voc /q");
    one();two();four();
    delay(1500);
    cleardevice();
    soundcue();
    break;
case 'g':
    system("vplay g.voc /q");
    one();two();four();five();
    delay(1500);
    cleardevice();
    soundcue();
    break;
case 'h':
    system("vplay h.voc /q");
    one();two();five();
    delay(1500);
    cleardevice();
    soundcue();
    break;
case 'j':
    system("vplay j.voc /q");
    two();four();five();
    delay(1500);
    cleardevice();
    soundcue();
    break;
case 'k':
    system("vplay k.voc /q");
    one();three();
    delay(1500);
    cleardevice();
    soundcue();
    break;
case 'l':
    system("vplay l.voc /q");
    one();two();three();
    delay(1500);
    cleardevice();
    soundcue();
    break;
case 'z':
    system("vplay z.voc /q");
    one();three();five();six();
    delay(1500);
    cleardevice();
    soundcue();
    break;
case 'x':
    system("vplay x.voc /q");
    one();three();four();six();
    delay(1500);
    cleardevice();
    soundcue();
    break;
case 'c':
    system("vplay c.voc /q");
    one();four();
    delay(1500);
    cleardevice();
    soundcue();
    break;
case 'v':
    system("vplay v.voc /q");
    one();two();three();six();
    delay(1500);
    cleardevice();
    soundcue();
    break;
case 'b':
    system("vplay b.voc /q");
    one();two();
    delay(1500);
    cleardevice();
    soundcue();
    break;
```

```
            case 'n':
                system("vplay n.voc /q");
                one();three();four();five();
                delay(1500);
                cleardevice();
                soundcue();
                break;
            case 'm':
                system("vplay m.voc /q");
                one();three();four();
                delay(1500);
                cleardevice();
                soundcue();
                break;

default:
                settextstyle(0,0,2);
                setcolor(14);
                system("vplay instruct.voc /q");
                outtextxy(64,450,"PRESS a to z.. Esc twice to quit.");
                delay(1000);
                setcolor(0);
                outtextxy(64,450,"PRESS a to z.. Esc twice to quit.");
                settextstyle(0,0,2);
        } /*END OF SWITCH*/
   }while((ch = getch()) != ESC);
   getch();
   cleardevice();
   closegraph();
/*SOUND CUE FOR FINISH OF PROGRAM MUSICAL KEYS A THEN C. */
sound(440);delay(100);nosound();sound(361.63);delay(300);nosound();
clrscr();
return 0;
}
```

```
/************************************************************
* FFJJ : a program to teach recognition of braille words that *
* have been imprinted on braille trainer cards, by sounding   *
* the words and putting the words in braille on the screen    *
* (for persons having residual vision). Words used are limited*
* to 7 letters in length to allow magnification. Braille      *
* dots used to represent letters are each numbered and called *
* in functions. Letters are demarked by being colored         *
* alternately red and light green. Braille punctuation and    *
* abbreviations known as contractions can also be included.   *
* The program was written using Borland C language compiler.  *
************************************************************/

/* Note: 4 words are illustrated in this demonstration   */
/* Up to 26 single words could be used for each set of 26 */
/* tactile flash cards.                                   */ include <stdio.h>
include <graphics.h>
#include <dos.h>
#include <conio.h>    /*for getch()       */
#include <stdlib.h>   /*for exit()        */
#include <process.h>  /*for system calls  */
include <ctype.h>    /*for tolower()     */ define ESC 27

/************************************************************
* FUNCTIONS ONE() TO FORTY2(): PRODUCE BRAILLE DOTS FOR SEVEN *
* LETTERS EACH MADE OF TWO COLUMNS OF THREE DOTS.  DOTS ARE   *
* NUMBERED FROM THE TOP OF THE FIRST COLUMN OF EACH LETTER    *
* TO THE BOTTOM OF THE COLUMN THEN FROM THE TOP OF THE        *
* SECOND COLUMN OF EACH LETTER TO THE BOTTOM OF THE COLUMN.   *
************************************************************/ void one(void)
  {
    setcolor(4);
    circle(12,200,8);
    setfillstyle(1,4);
    floodfill(12,200,4);
  }
void two(void)
  {
    setcolor(4);
    circle(12,240,8);
    setfillstyle(1,4);
    floodfill(12,240,4);
  }
void three(void)
  {
    setcolor(4);
    circle(12,280,8);
    setfillstyle(1,4);
    floodfill(12,280,4);
  }
void four(void)
  {
    setcolor(4);
    circle(52,200,8);
    setfillstyle(1,4);
    floodfill(52,200,4);
  }
void five(void)
  {
    setcolor(4);
    circle(52,240,8);
    setfillstyle(1,4);
    floodfill(52,240,4);
  }
```

```
void six(void)
{
    setcolor(4);
    circle(52,280,8);
    setfillstyle(1,4);
    floodfill(52,280,4);
}
void seven(void)
{
    setcolor(10);//LIGHT GREEN
    circle(108,200,8);
    setfillstyle(1,10);
    floodfill(108,200,10);
} void eight(void)
{
    setcolor(10);
    circle(108,240,8);
    setfillstyle(1,10);
    floodfill(108,240,10);
}
void nine(void)
{
    setcolor(10);
    circle(108,280,8);
    setfillstyle(1,10);
    floodfill(108,280,10);
}
void ten(void)
{
    setcolor(10);
    circle(148,200,8);
    setfillstyle(1,10);
    floodfill(148,200,10);
}
void eleven(void)
{
    setcolor(10);
    circle(148,240,8);
    setfillstyle(1,10);
    floodfill(148,240,10);
}
void twelve(void)
{
    setcolor(10);
    circle(148,280,8);
    setfillstyle(1,10);
    floodfill(148,280,10);
}
void thirteen(void)
{
    setcolor(4);
    circle(204,200,8);
    setfillstyle(1,4);
    floodfill(204,200,4);
}
void fourteen(void)
{
    setcolor(4);
    circle(204,240,8);
    setfillstyle(1,4);
    floodfill(204,240,4);
}
void fifteen(void)
{
    setcolor(4);
    circle(204,280,8);
    setfillstyle(1,4);
    floodfill(204,280,4);
}
```

```
void sixteen(void)
{
    setcolor(4);
    circle(244,200,8);
    setfillstyle(1,4);
    floodfill(244,200,4);
}
void sevnteen(void)
{
    setcolor(4);
    circle(244,240,8);
    setfillstyle(1,4);
    floodfill(244,240,4);
}
void eighteen(void)
{
    setcolor(4);
    circle(244,280,8);
    setfillstyle(1,4);
    floodfill(244,280,4);
}
void nineteen(void)
{
    setcolor(10);
    circle(300,200,8);
    setfillstyle(1,10);
    floodfill(300,200,10);
}
void twenty(void)
{
    setcolor(10);
    circle(300,240,8);
    setfillstyle(1,10);
    floodfill(300,240,10);
}
void twenty1(void)
{
    setcolor(10);
    circle(300,280,8);
    setfillstyle(1,10);
    floodfill(300,280,10);
}
void twenty2(void)
{
    setcolor(10);
    circle(340,200,8);
    setfillstyle(1,10);
    floodfill(340,200,10);
}
void twenty3(void)
{
    setcolor(10);
    circle(340,240,8);
    setfillstyle(1,10);
    floodfill(340,240,10);
}
void twenty4(void)
{
    setcolor(10);
    circle(340,280,8);
    setfillstyle(1,10);
    floodfill(340,280,10);
}
void twenty5(void)
{
    setcolor(4);
    circle(396,200,8);
    setfillstyle(1,4);
    floodfill(396,200,4);
}
void twenty6(void)
{
    setcolor(4);
    circle(396,240,8);
    setfillstyle(1,4);
    floodfill(396,240,4);
}
```

```
void twenty6( )
{
    setcolor(4);
    circle(396,240,8);
    setfillstyle(1,4);
    floodfill(396,240,4);
}
void twenty7(void)
{
    setcolor(4);
    circle(396,280,8);
    setfillstyle(1,4);
    floodfill(396,280,4);
}
void twenty8(void)
{
    setcolor(4);
    circle(436,200,8);
    setfillstyle(1,4);
    floodfill(436,200,4);
}
void twenty9(void)
{
    setcolor(4);
    circle(436,240,8);
    setfillstyle(1,4);
    floodfill(436,240,4);
}
void thirty(void)
{
    setcolor(4);
    circle(436,280,8);
    setfillstyle(1,4);
    floodfill(436,280,4);
}
void thirty1(void)
{
    setcolor(10);
    circle(492,200,8);
    setfillstyle(1,10);
    floodfill(492,200,10);
}
void thirty2(void)
{
    setcolor(10);
    circle(492,240,8);
    setfillstyle(1,10);
    floodfill(492,240,10);
}
void thirty3(void)
{
    setcolor(10);
    circle(492,280,8);
    setfillstyle(1,10);
    floodfill(492,280,10);
}
void thirty4(void)
{
    setcolor(10);
    circle(532,200,8);
    setfillstyle(1,10);
    floodfill(532,200,10);
}
void thirty5(void)
{
    setcolor(10);
    circle(532,240,8);
    setfillstyle(1,10);
    floodfill(532,240,10);
}
void thirty6(void)
{
    setcolor(10);
    circle(532,280,8);
    setfillstyle(1,10);
    floodfill(532,280,10);
}
```

```c
void thirty7(void)
{
    setcolor(4);
    circle(588,200,8);
    setfillstyle(1,4);
    floodfill(588,200,4);
}
void thirty8(void)
{
    setcolor(4);
    circle(588,240,8);
    setfillstyle(1,4);
    floodfill(588,240,4);
}
void thirty9(void)
{
    setcolor(4);
    circle(588,280,8);
    setfillstyle(1,4);
    floodfill(588,280,4);
}
void forty(void)
{
    setcolor(4);
    circle(628,200,8);
    setfillstyle(1,4);
    floodfill(628,200,4);
}
void forty1(void)
{
    setcolor(4);
    circle(628,240,8);
    setfillstyle(1,4);
    floodfill(628,240,4);
}
void forty2(void)
{
    setcolor(4);
    circle(628,280,8);
    setfillstyle(1,4);
    floodfill(628,280,4);
}
/****************************************************************
* FUNCTION SOUNDCUE(): PRODUCES SOUND OF MIDDLE C AS A CUE      *
* THAT THE PROGRAM IS READY TO ACCEPT ANOTHER WORD              *
****************************************************************/
void soundcue(void)
{
    sound(261.63); delay(100); nosound();
}
/***************/
int main (void)
/***************/
{
    int gdriver = DETECT, gmode, errorcode;
    void one(void);
    void two(void);
    void three(void);
    void four(void);
    void five(void);
    void six(void);
    void seven(void);
    void eight(void);
    void nine(void);
    void ten(void);
    void eleven(void);
    void twelve(void);
    void thirteen(void);
    void fourteen(void);
    void fifteen(void);
    void sixteen(void);
    void sevnteen(void);
    void eighteen(void);
    void nineteen(void);
```

```
    void twenty(void);
    void twenty1(void);
    void twenty2(void);
    void twenty3(void);
    void twenty4(void);
    void twenty5(void);
    void twenty6(void);
    void twenty7(void);
    void twenty8(void);
    void twenty9(void);
    void thirty(void);
    void thirty1(void);
    void thirty2(void);
    void thirty3(void);
    void thirty4(void);
    void thirty5(void);
    void thirty6(void);
    void thirty7(void);
    void thirty8(void);

void thirty9(void);
    void forty(void);
    void forty1(void);
    void forty2(void);
    void soundcue(void);
    char ch;

/*GRAPHIC SET-UP : */
 errorcode = registerfarbgidriver(EGAVGA_driver_far);
 if(errorcode < 0)
   {
     printf("Graphics error: %s\n", grapherrormsg(errorcode));
     printf("Press any key to halt. \n");
     getch();
     exit(1);
   }
 initgraph(&gdriver, &gmode, "");
 errorcode = graphresult();
 if(errorcode != grOk)
   {
     printf("Graphic error : sorry : %s\n", grapherrormsg(errorcode)
     printf("Press any key to halt. \n");
     getch();
     exit(1);
   }

/*TITLE PAGE AND START CUE :*/
 rectangle(0,0,639,479);
 settextstyle(0,0,3);
 setcolor(13);
 outtextxy(224,50,"FFJJ");
 outtextxy(78,100,"BRAILLE WORD TRAINER");
 setcolor(15);
 settextstyle(0,0,1);
 outtextxy(270,150,"(c) A.W. Perry,");
 outtextxy(240,175,"Victoria, B.C.,Canada");
 delay(3000); /*three second delay*/
 cleardevice();
 settextstyle(0,0,2);
 setcolor(15);
 outtextxy(16,240,"USE CARD OR PRESS ESCAPE TWICE TO QUIT.");
 delay(2000);
 cleardevice();
 system("vplay message.voc /q");   /*VOICE INSTRUCTION*/
 delay(25);
 soundcue(); /*READY TO START CUE*/ ch = getch();
```

24

```
do
{
    switch (tolower(ch))
    {
        case 'a': /*e.g.: word: "apple" */
            one();                                                  /*a*/
            seven();eight();nine();ten();                           /*p*/
            thirteen();fourteen();fifteen();sixteen();              /*p*/
            nineteen();twenty();twenty1();                          /*l*/
            twenty5();twenty9();                                    /*e*/
            system("vplay apple.voc /q");
            delay(3000); /*3 second delay*/
            cleardevice();
            soundcue();
            break;
        case 'b': /*e.g.word: "banana" */
            one();two();                                            /*b*/
            seven();                                                /*a*/
            thirteen();fifteen();sixteen();sevnteen();              /*n*/
            nineteen();                                             /*a*/
            twenty5();twenty7();twenty8();twenty9();                /*n*/
            thirty1();                                              /*a*/
            system("vplay banana.voc /q");
            delay(3000);
            cleardevice();
            soundcue();
            break;
        case 'c':/* e.g word: "carrot" */
            one();four();                                           /*c*/
            seven();                                                /*a*/
            thirteen();fourteen();fifteen();sevnteen();             /*r*/
            nineteen();twenty();twenty1();twenty3();                /*r*/
            twenty5();twenty7();twenty9();                          /*o*/
            thirty2();thirty3();thirty4();thirty5();                /*t*/
            system("vplay carrot.voc /q");
            delay(3000);
            cleardevice();
            soundcue();
            break;

case 'd':/*word: "cookies' */
            one();four();                                           /*c*/
            seven();nine();eleven();                                /*o*/
            thirteen();fifteen();sevnteen();                        /*o*/
            nineteen();twenty1();                                   /*k*/
            twenty6();twenty8();                                    /*i*/
            thirty1();thirty5();                                    /*e*/
            thirty8();thirty9();forty();                            /*s*/
            system("vplay cookies.voc /q");
            delay(3000);
            cleardevice();
            soundcue();
            break;
        default:
            settextstyle(0,0,2);
            setcolor(14);
            system("vplay message.voc /q");
            outtextxy(16,240,"USE CARD OR PRESS ESCAPE TWICE TO QUIT."

delay(1500);
            setcolor(0);
            outtextxy(16,240,"USE CARD OR PRESS ESCAPE TWICE TO QUIT."

}
})while((ch = getch()) != ESC);
getch();
cleardevice();
closegraph();

/*SOUND CUE FOR FINISH OF PROGRAM : */
sound(440);delay(100);nosound();sound(361.63);delay(300);nosound();
clrscr();
return 0;
}
```

What is claimed is:

1. A braille learning apparatus for use with a computer having a keyboard port comprising:
   a housing;
   a grid board having a card-receiving surface with a multiplicity of discrete pairs of electrically conducting contacts;
   a removable card having a periphery mating with that of the card-receiving surface and having a front and a back surface, said card having
      a pattern of braille dots embossed upon its front surface,
      means for tactilely identifying a preselected orientation of the card for positioning the card in mating contact with the card-receiving surface, and
      a pair of electrically connected conducting contacts protruding from its back surface at preselected positions corresponding to the positions of a selected one of the discrete pairs of the electrically conducting contacts on the card-receiving surface of the grid board such that if the card is positioned with back surface of the card in mating contact with the card-receiving surface in the preselected orientation the selected pair of electrically conducting contacts on the card-receiving surface of the grid board will be electrically connected together;
   means for mounting the grid board to the housing so that the card may be placed, on the basis of tactile information only, upon the grid board with the back surface of the card in mating contact with the card-receiving surface in the preselected orientation; and
   a keyboard encoder mounted in the housing, said keyboard encoder having an output port for connection by cable of the keyboard encoder to the keyboard port of the computer and said keyboard encoder electrically connected to the grid board contacts so as to output a keystroke signal in response to electrical connection together of a pair of grid board contacts, said keystroke signal determined by location of the pair of electrically connected contacts.

2. The braille learning apparatus as defined in claim 1 for use with a computer capable of sound generation under program control, additionally comprising software for operating the computer so that the computer generates a discrete sound pattern for each discrete keystroke signal received at the keyboard port, each discrete sound pattern selected using a preselected mapping of the pattern of braille dots embossed on the card to a discrete keystroke signal, whereby the selected sound pattern is produced by placement of the card in mating contact with the card-receiving surface in the preselected orientation.

3. The braille learning apparatus as defined in claim 2, wherein the sound pattern generated by the computer is selected to be the spoken equivalent of the pattern of braille dots on the card.

4. The braille learning apparatus as defined in claim 3, wherein the spoken equivalent of the pattern of braille dots on the card is generated from digitized recorded human speech.

5. The braille learning apparatus as defined in claim 1 for use with a computer capable of visual display of graphics under program control, additionally comprising software for operating the computer so that the computer displays a preselected graphic representation of the pattern of braille dots embossed upon the card corresponding to each discrete keystroke signal received at the keyboard port.

6. The braille learning apparatus as defined in claim 1 for use with a computer capable of sound generation under program control and capable of visual display of graphics under program control, additionally comprising software for operating the computer so that the computer generates a preselected sound and displays a preselected graphic representation of the pattern of braille dots embossed upon the card corresponding to each discrete keystroke signal received at the keyboard port.

7. The braille learning apparatus as defined in claim 2, wherein the software is loaded and run in response to sequential entry of a combination of keystrokes "F" and "J" from a keyboard connected to the computer.

8. The braille learning apparatus as defined in claim 7, wherein the combination of keystrokes is "F" followed by "J".

9. The braille learning apparatus as defined in claim 2, wherein
   (a) the keyboard encoder has an input header with a multiplicity of column input pins and a multiplicity of row input pins, whereby when a column input pin is electrically connected to a row input pin said keyboard encoder outputs a keystroke signal uniquely determined by the particular column and row input pins electrically connected, and
   (b) the keyboard encoder is electrically connected to grid board by a ribbon cable electrically connecting the input pins of the input header of the keyboard encoder to the electrically conducting contacts of the grid board such that one contact of each discrete pair of the electrically conducting contacts of the grid board is connected to a selected column input pin and the other contact is connected to a selected row input pin, said row and column input pins selected so that the combination of row and column input pins is unique for each discrete pair of electrically conducting contacts of the grid board.

10. The braille learning apparatus as defined in claim 9, wherein the sound generated by the computer is selected to be the spoken equivalent of the pattern of braille dots on the card.

11. The braille learning apparatus as defined in claim 10, wherein the spoken equivalent of the pattern of braille dots on the card is generated from digitized recorded human speech.

12. The braille learning apparatus as defined in claim 11 for use with a computer capable of visual display of graphics under program control, additionally comprising software for operating the computer so that the computer displays a preselected graphic representation of the pattern of braille dots embossed upon the card corresponding to each discrete keystroke signal received at the keyboard port.

13. The braille learning apparatus as defined in claim 12, wherein the software is loaded and run in response to sequential entry of a combination of keystrokes "F" and "J" from a keyboard connected to the computer.

14. The braille learning apparatus as defined in claim 13, wherein the combination of keystrokes is "F" followed by "J".

15. A braille learning apparatus comprising:
   a set of cards, each individual card having a pattern of braille dots embossed on a surface of the card and two electrically connected contacts at a unique set of discrete spaced positions on the card, with a preselected correspondence between the pattern of braille dots embossed on the surface of the card and the selected positions of the contacts;

means for storing data representing the correspondence between the pattern of braille dots embossed on the surface of each individual card and the positions of the contacts on that card;

position sensing means for sensing the positions of the contacts on a card; and means for producing a distinct sound in response to the positions of the contacts on a card based upon the stored data representing the correspondences, each said distinct sound being uniquely correlated with a selected one set of the positions of the contacts.

16. The braille learning apparatus as defined in claim 15, wherein the sound produced is selected to be the spoken equivalent of the pattern of braille dots embossed on the card.

17. A set of cards for learning braille comprising a plurality of individual cards, each individual card comprising a card having a pattern of braille dots embossed upon a surface of the card and two electrically connected contacts at a unique set of discrete spaced positions on the card, with a preselected correspondence between the pattern of braille dots embossed upon the surface of the card and the selected positions of the contacts, said set of cards for use in an apparatus, said apparatus having means for storing data representing the correspondences between the pattern of braille dots embossed upon the surface and the positions of the contacts on each individual card, position sensing means for sensing the positions of the contacts on a card, and means for producing a distinct sound in response to the positions of the contacts on a card based upon the stored data representing the correspondences, each said distinct sound being uniquely correlated with a selected one set of the positions of the contacts.

18. A braille learning apparatus for use with a computer having a keyboard port, comprising:

a housing;

a card-receiving means having a multiplicity of discrete spaced apart electrically conducting contacts;

a removable card having a front surface, said card having a pattern of braille dots embossed upon its front surface, a mating portion of the card for contacting the contacts of the card-receiving means, means for tactilely identifying a preselected orientation of the card so that the card may be positioned with the mating portion of the card in contact with the contacts of the card-receiving means, and a pair of electrically connected conducting contacts at preselected positions of the mating portion of the card, said pair of contacts corresponding to the positions of a selected pair of the electrically conducting contacts of the card-receiving means such that if the mating portion of the card is positioned in contact with the contacts of the card-receiving means in the preselected orientation the selected pair of electrically conducting contacts of the card-receiving means will be electrically connected together;

means for mounting the card-receiving means to the housing so that the mating portion of the card may be positioned, on the basis of tactile information only, in contact with the card-receiving means in the preselected orientation; and a keyboard encoder mounted in the housing, said keyboard encoder having an output port for connection by cable of the keyboard encoder to the keyboard port of the computer and said keyboard encoder electrically connected to the contacts of the card-receiving means so as to output a keystroke signal in response to electrical connection together of a pair of the contacts of the card-receiving means, said keystroke signal determined by location of the pair of electrically connected contacts.

19. The braille learning apparatus as defined in claim 18 for use with a computer capable of sound generation under program control, additionally comprising software for operating the computer so that the computer generates a discrete sound pattern for each discrete keystroke signal received at the keyboard port, whereby the sound pattern is produced by placement of the card in mating contact with the card-receiving surface in the preselected orientation.

20. The braille learning apparatus as defined in claim 19, wherein the sound generated by the computer is selected to be the spoken equivalent of the pattern of braille dots on the card.

* * * * *